Jan. 2, 1968   J. MARTIN   3,361,958
NONDESTRUCTIVE METHOD OF DETECTING CONTAMINATED INCANDESCENT
LAMPS OR SIMILAR DEVICES UTILIZING RADIATION GENERATED
WITH LOW POWER INPUTS
Filed June 10, 1965

STANDARD 100 WATT, 120 VOLT
LAMP LIGHTED AT 20 VOLTS

CONTAMINATED 100 WATT, 120 VOLT
LAMP LIGHTED AT 20 VOLTS

CONTAMINATED 100 WATT, 120 VOLT
LAMP RELIGHTED AT 20 VOLTS

INVENTOR
Jack Martin
BY
D. S. Bulge
AGENT

United States Patent Office 3,361,958
Patented Jan. 2, 1968

3,361,958
NONDESTRUCTIVE METHOD OF DETECTING CONTAMINATED INCANDESCENT LAMPS OR SIMILAR DEVICES UTILIZING RADIATION GENERATED WITH LOW POWER INPUTS
Jack Martin, Paramus, N.J., assignor to Westinghouse Electric Corporation, Pittsburgh, Pa., a corporation of Pennsylvania
Filed June 10, 1965, Ser. No. 462,938
8 Claims. (Cl. 324—20)

ABSTRACT OF THE DISCLOSURE

The presence of small amounts of gaseous or other contaminants in a fabricated incandescent lamps, or similar device having an incandescible element, is detected by operating the lamp at less than 25% of its rated voltage (or wattage) and comparing its radiated output in the visible or infrared region with a noncontaminated lamp of the same type and rating that is operated under the same conditions. The power loading is such that contaminants on the heated filament of the lamp being tested are not vaporized. Lamps with outputs 10% or more below that of the standard lamp are contaminated.

---

This invention relates to electric lamps and has particular reference to a method of determining the quality of electric incandescent lamps prior to shipment and detecting those that contain impurities or contaminated filaments.

As is well known, many test are conducted by lamp manufacturers to prevent defective lamps from being packed and shipped. One of the most difficult quality control problems is the detection of lamps that contain small amounts of contamination. The contaminant can be in the form of a deposit on the filament itself, or it may comprise a gaseous impurity such as air or oxygen that is inadvertently sealed within the lamp and subsequently oxidizes the tungsten filament when the lamp is energized. While the tungsten oxide or other compound produced by such contaminants is evaporated from the filament when the latter reaches its normal operating temperature, its presence within the lamp increases the rate of evaporation of the filament and eventually causes the lamp to fail prematurely. Since only minute quantities of contamination are present, such lamps are frequently not detected during the high-voltage flashing operation or at the final test light-up in the factory and are thus passed by the inspector.

In view of the foregoing, it is the general object of the present invention to provide an improved method of determining the quality of electric incandescent lamps.

Another and more specific object is a non-destructive method of rapidly and conveniently detecting incandescent lamps that contain contaminated filaments or small amounts of impurities that would impair lamp performance.

The foregoing objectives, and other advantages which will become apparent to those skilled in the art as the description proceeds, are achieved in accordance with the present invention by lighting the lamp at a predetermined test voltage (or wattage) below its rated operating voltage (or wattage) and comparing its brightness with that of a standard lamp that is operated under the same test conditions and is free from contaminants. If the test lamp contains even very small amounts of impurities, such as air or oxygen, a marked and very noticeable decrease in the brightness of the filament occurs.

While the reason for the aforementioned phenomenon is not wholly understood, it is believed that the oxygen reacts with the heated tungsten filament and forms a layer of tungsten oxide which, due to the low power input to and the corresponding low operating temperature of the filament, remains on the surface of the filament and increase its radiation emissivity and reduces its resistance. As a result, the filament temperature and the brightness of the contaminated lamp are drastically reduced to such a level that the change can be easily detected visually, or by a suitable electronic circuit that includes a photoelectric device.

A better understanding of the invention will be obtained by referring to the accompanying drawing, wherein.

While the present invention can be used to detect small amounts of contaminants in various types of electrical devices having an incandescible element, it is especially adapted for use in conjunction with the testing of finished electric incandescent lamps and has accordingly been so illustrated and will be so described.

THE METHOD

Figure 1:
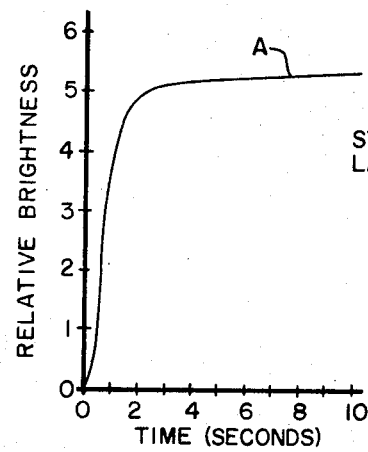
FIG. 1 is a graph illustrating the variation in brightness with time of a 100 watt 120 volt general lighting incandescent lamp that is free from contaminants and operated at 20 volts in accordance with this invention.

With specific reference now to the drawing, the graph of FIG. 1 illustrates the typical brightness-versus-time characteristic of an uncontaminated lamp when operated at a test voltage such that its filament is heated to a dull red glow. In this particular case, a 100 watt A19 (inside-frost) lamp having a rated operating voltage of 120 volts was fabricated under carefully controlled conditions to provide a standard lamp that contained a clean coiled-coil tungsten filament and was free from air and oxygen and other impurities that would oxidize or otherwise contaminate the filament when it was energized. This standard lamp was then operated at 20 volts for approximately 10 seconds and the change in brightness during this period was measured by means of a photomultiplier circuit and a suitable recorder. As indicated by the curve A (FIG. 1) thus obtained, the brightness of the standard or clean lamp increased sharply during the first second after the test voltage was applied, started to level off after two seconds and then slowly increased at a steady rate for the remainder of the 10 second test period.

In contrast, the curve B (shown in FIG. 2) obtained on an identical lamp which contained a small amount of air shows that the brightness of the contaminated lamp rapidly increases for the first second or so after the test voltage is applied, then falls off sharply and levels off at a value less than half of its peak brightness after about six seconds, and remains at this level of brightness for the rest of the 10 second test period. The shape of curve B is thus very different from that of curve A and the difference in brightness of the two lamps at the end of the 10 second period is of such magnitude that it can be readily detected visually in the case of lamps having clear bulbs, and even in lamps having bulbs that are inside-frosted or coated with silica powder or the like. Tests have shown that the phenomenon occurs in both vacuum and gas-filled lamps.

The drastic drop in brightness of the contaminated lamp is believed to be due to the inherent tendency of the heated filament to act as a getter for the residual oxygen gas. The resulting layer of tungsten oxide which forms on the filament, even though it may be so thin as to be barely detectable visually, changes the emissivity and radiating properties of the filament and reduces its resistance. Thus, the filament temperature and brightness of the lamp suddenly drop at the point in time when this oxide coating forms on the filament. The oxide coating remains on the filament and continues to decrease its temperature insofar as the lamp is operated at only 20 volts instead of its rated operating voltage of 120 volts. At this low voltage the filament has an operating temperature of about 800° C. to 900° C.

It has been found that at temperatures above about 1000° C. the tungsten oxide evaporates from the filament at a rapid rate and the filament returns to its clean state. When this occurs, the contaminated lamp will have a brightness equal to that of the standard lamp. This explains why small amounts of contamination are not detected during the flashing operation or final test light-up in the factory when the lamp is operated at its rated voltage, or at a slightly higher voltage. Hence, in accordance with the present invention the test voltage is so selected that the resulting filament temperature is below 1000° C., and preferably in the order of about 800° C. to 900° C. In the case of a lamp having a rated operating voltage range of from 110 to 130 volts, the desired filament temperature will be obtained by using a test voltage in the range of from approximately 10 to 20 volts. Satisfactory results have been obtained by using a test voltage which is from 10% to 17% of the rated operating voltage of the lamp.

Figure 2:
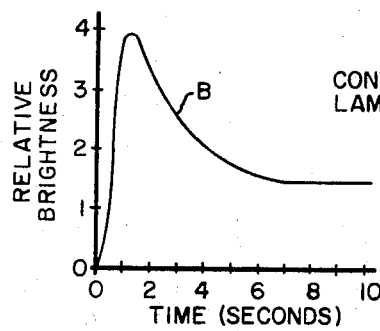
FIG. 2 is a similar graph of a contaminated lamp of the same size and type operated at the same test voltage.

As will be noted from a comparison of the graphs shown in FIGURES 1 and 2, the brightness of the contaminated lamp at the end of the 10 second low-voltage test light-up is less than ⅖ (40%) that of the standard lamp. The present invention accordingly provides a very accurate and sensitive means for determining the quality of a finished lamp quickly and inexpensively.

Experience has shown that if the brightness of the test lamp at the end of the burning period is materially less, that is, at least 10% less, than the brightness of the standard lamp, then the test lamp is contaminated with some impurity and should be rejected.

Figure 3:
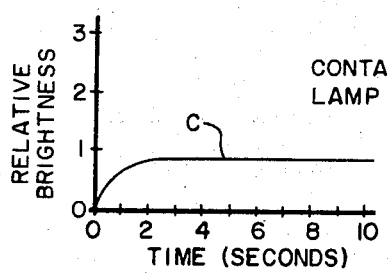
FIG. 3 is a graph illustrating the brightness-versus-time characteristic of the aforesaid contaminated lamp when relighted at the same test voltage.

As shown by the curve C (FIG. 3), when the contaminated lamp is relighted at the same test voltage its brightness increases but quickly levels off at a value below that which prevailed at the end of the initial 10 second light-up (FIG. 2). This is probably due to the fact that the oxidation process continued while the lamp cooled down and was reheated—thereby increasing the thickness of tungsten oxide film on the filament.

APPARATUS

While the test procedure can be based upon visual observations of the standard and test lamps, measurements have shown that in the low filament temperature range involved only a minute portion of the energy radiated by the filament is in the visible region of the spectrum whereas about ¼ of the total energy is in the near-infrared region below 2.5 microns. Hence, a more sensitive and accurate determination of the variations in the radiated output of the test lamp could be made by measuring its infrared output by means of a photocell. This can very readily be accomplished by employing apparatus of the type shown in FIG. 4. The detector consists of a suitable photocell 10, such as a cesium photoemissive (type S-1) cell, that is connected in series with a 90 volt battery 12 and a microammeter 14 by means of conductors 16. The photocell 10 is preferably mounted in a small black box having an opening located about 10 cm. from the center of the test lamp 20. The aforementioned type of cesium photocell has a spectral response that peaks at around 0.85 micron and has a long-wavelength cut-off at 1.2 microns. It is thus very sensitive to red light and near-infrared radiation and makes an excellent detector for this application.

If desired, a filter 18 that has high transmission at wavelengths longer than about 8000 A. and is opaque to wavelengths shorter than 8000 A. can be placed in front of the photocell 10 to eliminate variations in the ammeter readings that may arise due to ambient light fluctuations. A Wratten #87 gelatin filter or a Polaroid (type XRX) nylon-base filter would be suitable since they both have a sharp short-wave cut-off at around 0.76 micron.

A silicon solar photo-voltaic cell having a spectral response which is similar to that of the aforesaid cesium cell can be used in place of the latter, if desired. Since a silicon cell produces an EMF when illuminated, it will activate the microammeter 14 directly and the battery 12 can be eliminated.

Figure 4:
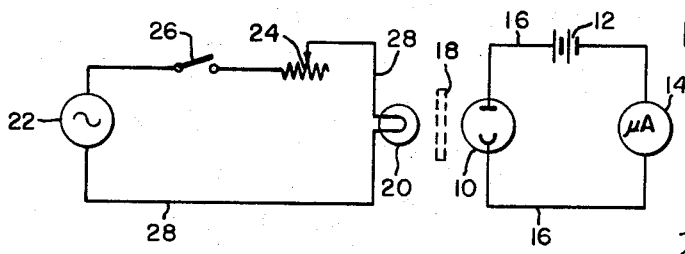
FIG. 4 is a schematic diagram of one form of radiation sensing-and-measuring apparatus and lamp-energizing circuit for practicing the invention.

As is also shown in FIG. 4, the lamp 20 to be tested is connected to a suitable voltage source 22 in series with a potentiometer 24, or other voltage regulating device, by means of a switch 26 and conductors 28. The desired test voltage can be applied to the test lamp 20 as required by properly adjusting the potentiometer 24 and closing the switch 26.

ALTERNATIVE METHODS

Instead of separately energizing the standard lamp and the test lamp to compare their brightness, the lamps can be connected in series and energized by applying a suitable test voltage. The same current will thus pass through both filaments and a direct comparison of the lamps can be made by means of a single operation.

Also, the lamps can be operated on a circuit that supplies a constant wattage rather than a constant voltage. This arrangement would be preferred since it would magnify the differences in the brightness-time characteristics of the respective lamps and permit both qualitative and quantitative analyses to be made. For a 100 watt lamp, operation at a loading of about 5 or 7 watts would be suitable.

As will be obvious, the lamp-energizing and detector circuits can be made part of a high-speed lamp-manufacturing machine and combined with a suitable ejection mechanism to automatically test the quality of lamps on a mass-projection basis in the factory and reject those that are contaminated.

Since either the visible or infrared radiation of the test and standard lamps can be compared, the invention is not limited in this regard and includes within its scope the testing of lamps by comparing their radiated outputs at a predetermined power input. The term "radiated output" as used in the appended claims means energy of any wavelength that is radiated by the energized filaments and can be measured or monitored.

TEST DATA

Tests have shown that an oxide film on the filament of a 100 watt 120 volt lamp will reduce the filament temperature by as much as 150° C., and that photoelectric radiation detectors record differences of from 25% to 80% in the radiated outputs of lamps with clean and oxidized filaments.

It will be appreciated from the foregoing that the objects of the invention have been achieved in that a very simple and inexpensive non-destructive method for detecting small amounts of contaminants on the filament of, or within, a finished electric incandescent lamp on a mass-production basis has been provided.

While various embodiments have been illustrated and described, it will be appreciated that other modifications in the test procedure can be made without departing from the spirit and scope of the invention. For example, the method can be used to inspect lamps of various sizes and wattages having clear, inside-frosted or silica coated bulbs. Colored lamps having coatings which transmit red or near-infrared radiation can also be tested by the disclosed method.

I claim as my invention:

1. The method of detecting an electric incandescent lamp or similar device that contains a contaminated filament or an impurity which contaminates the filament when the lamp is energized, which method comprises:

fabricating an incandescent lamp that is of the same type and has the same rated wattage and operating voltage as the lamp to be processed but which is free from such contaminants and thus constitutes a standard lamp, operating said standard lamp with a power input that is (a) less than that required to operate it at its rated wattage, and (b) is such that the resulting filament temperature is below that at which the contaminant vaporizes, determining the radiated output of said standard lamp at the aforesaid reduced power loading, operating the lamp being processed with the same reduced power input and determining its radiated output, and then classifying the lamp thus tested as a contaminated lamp if its radiated output is materially less than that of the standard lamp.

2. The method set forth in claim 1 wherein said reduced power input is such that the resulting filament temperature is less than 1000° C.

3. The method set forth in claim 1 wherein the radiated outputs of said lamps in the infrared region of the spectrum are measured and compared.

4. The method of detecting an electric incandescent lamp that contains a contaminated filament or an impurity which contaminates the filament when the lamp is energized, which method comprises:

fabricating an incandescent lamp that is of the same type and has the same rated wattage and operating voltage as the lamp to be processed but which is free from such contaminants and thus constitutes a standard lamp, applying to said standard lamp a test voltage such that the lamp operates at a predetermined constant wattage below its rated wattage and the resulting filament temperature is below that at which the contaminant vaporizes, operating said standard lamp at said constant wattage and determining its radiated output during such operation, operating the lamp being processed at the aforesaid constant wattage and comparing its radiated output with that of the standard lamp, and then classifying the lamp thus tested as a contaminated lamp if its radiated output is materially less than that of the standard lamp.

5. A non-destructive method for detecting a contaminated filament in an electric incandescent lamp having a predetermined rated operating voltage, or the presence within said lamp of a gaseous impurity that contaminates the filament when the lamp is first energized, and thereby determining the quality of said lamp, which method comprises:

fabricating a lamp that is of the same type and has the same wattage and voltage rating as the lamp to be processed but which is free from such contaminants and thus constitutes a standard lamp, applying to said standard lamp a test voltage that is less than 25% of its rated operating voltage and produces a filament temperature less than 1000° C., operating the standard lamp on the aforesaid test voltage for a predetermined period of time and determining the brightness of the standard lamp at the end of said time period, applying the aforesaid test voltage to the lamp being processed for the same period of time and determining its brightness at the end of said time period, and then classifying the lamp thus processed as a contaminated lamp if its brightness is less than that of the standard lamp at the end of said predetermined period of time.

6. The method set forth in claim 5 wherein said test voltage is from about 10% to 17% of the rated operating voltage and is applied to the respective lamps for a period less than one minute.

7. The method of detecting a contaminated filament in an electric incandescent lamp, or the presence in said lamp of a gaseous impurity which oxidizes the lamp when the latter is energized, which method comprises:

fabricating an incandescent lamp that is of the same type and wattage and has the same rated operating voltage as the lamp to be processed but which is free from such contaminants and thus constitutes a standard lamp, connecting said standard lamp in series with the lamp being tested, applying to said series-connected lamps a predetermined test voltage below their rated operating voltage so that the same amount of current passes through both lamp filaments and the resulting temperature of each of said filaments is below that at which the contaminant vaporizes, operating said lamps on said test voltage for a predetermined period of time, determining the radiated output of said lamps during said time period, and then classifying the lamp thus tested as a contaminated lamp if its radiated output is less than that of the standard at the end of said time period.

8. The method of testing an electric incandescent lamp having a rated operating voltage in the range of about 110 to 130 volts to detect the presence therein of an impurity that contaminates the filament, which method comprises:

fabricating a lamp of the same type and voltage rating as the one to be tested but which is free from such contamination and thus constitutes a standard lamp, applying to said standard lamp a predetermined voltage within the range of from about 10 to 20 volts so that the lamp filament becomes incandescent, operating the standard lamp on the aforesaid predetermined voltage for about 10 seconds and observing its brightness at the end of said period of time, applying the aforesaid predetermined voltage to the lamp being tested for substantially the same period of time and observing its brightness at the end of said time period, and then rejecting the lamp thus processed if its observed brightness is less than that of the standard lamp.

References Cited

UNITED STATES PATENTS

| | | | |
|---|---|---|---|
| 1,771,915 | 7/1930 | Campbell | 324—20 |
| 2,664,543 | 12/1953 | Thayer | 324—20 |

RUDOLPH V. ROLINEC, *Primary Examiner.*

E. STOLARUN, *Assistant Examiner.*